(12) United States Patent
Mahmoud et al.

(10) Patent No.: US 11,983,860 B2
(45) Date of Patent: May 14, 2024

(54) MACHINE LEARNING MODEL FOR IDENTIFYING SURFACES IN A TUBULAR

(71) Applicant: DarkVision Technologies Inc., North Vancouver (CA)

(72) Inventors: Anas Mahmoud, Toronto (CA); Siavash Khallaghi, Vancouver (CA)

(73) Assignee: DarkVision Technologies Inc., North Vancouver (CA)

( * ) Notice: Subject to any disclaimer, the term of this patent is extended or adjusted under 35 U.S.C. 154(b) by 384 days.

(21) Appl. No.: 17/540,251

(22) Filed: Dec. 2, 2021

(65) Prior Publication Data

US 2022/0215526 A1 Jul. 7, 2022

(30) Foreign Application Priority Data

Jan. 4, 2021 (GB) ...................................... 2100058

(51) Int. Cl.
*G06K 9/00* (2022.01)
*G06T 7/00* (2017.01)

(52) U.S. Cl.
CPC .. *G06T 7/0004* (2013.01); *G06T 2207/20076* (2013.01); *G06T 2207/20081* (2013.01); *G06T 2207/20084* (2013.01)

(58) Field of Classification Search
CPC ......... G06T 7/0004; G06T 2207/20076; G06T 2207/20081; G06T 2207/20084; G06T 2207/10136; G06T 7/12; G06T 7/10; G06T 7/60; G06T 2207/10132; G06T 2207/20168; G06T 2207/30108; E21B 47/00; E21B 47/002; G01N 29/36; G01N 29/4445; G01N 29/4481
See application file for complete search history.

(56) References Cited

U.S. PATENT DOCUMENTS

| | | | |
|---|---|---|---|
| 10,781,690 B2 | 9/2020 | Malik et al. | |
| 2016/0327675 A1* | 11/2016 | Donderici | E21B 47/18 |
| 2020/0055196 A1 | 2/2020 | Halpenny et al. | |
| 2021/0103052 A1 | 4/2021 | Rae et al. | |
| 2023/0358911 A1* | 11/2023 | Luu | G01V 1/50 |

FOREIGN PATENT DOCUMENTS

| | | | | |
|---|---|---|---|---|
| CN | 110060248 A | * | 7/2019 | ........... G06T 7/0004 |
| CN | 111784645 A | * | 10/2020 | ........... G06N 3/0454 |
| GB | 2554601 A | | 4/2018 | |
| GB | 2572834 A | | 10/2019 | |
| WO | 2016201583 A1 | | 12/2016 | |
| WO | 2019236832 A1 | | 12/2019 | |
| WO | WO-2019236832 A1 | * | 12/2019 | ......... E21B 47/0025 |

OTHER PUBLICATIONS

Search Report received for GB Application No. 2100058.3, dated Jun. 25, 2021, 02 Pages.

\* cited by examiner

*Primary Examiner* — Xin Jia

(57) ABSTRACT

A method and instruction memory for processing acoustic images of a tubular to determine the surface of the tubular. The images may be acquired by an acoustic logging tool deployed into a pipe or well. A Machine Learning model is trained to recognize regions of the acoustic images that are internal to the tubular or not, in order to determine surface pixels. The surface pixels may be rendered to create visualizations of the tubular where noise and non-surface features are filtered out automatically.

20 Claims, 12 Drawing Sheets

```
┌─────────────────────────────────────────────────┐
│  Deploy imaging device thru tubular to create long │
│              images in R, Θ, Z                  │
└─────────────────────────────────────────────────┘
                        ↓
┌─────────────────────────────────────────────────┐
│  Manually label pixels of images as 'boundary,' │
│   surrounding regions are thus inner or outer.  │
└─────────────────────────────────────────────────┘
                        ↓
┌─────────────────────────────────────────────────┐
│ Train Neural Net model using labelled images. Store model │
└─────────────────────────────────────────────────┘
```

Fig. 7

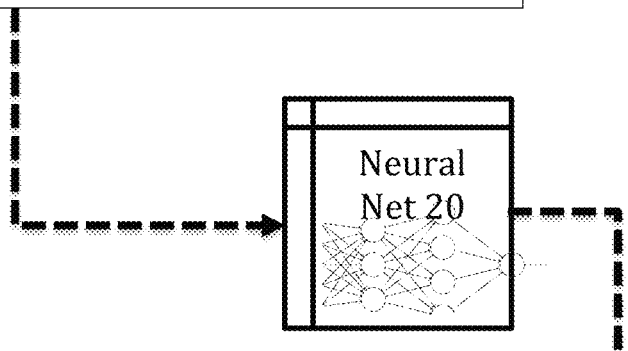

Neural Net 20

```
┌─────────────────────────────────────────────────┐
│     Select segment(s) of the image to process   │
└─────────────────────────────────────────────────┘
                        ↓
┌─────────────────────────────────────────────────┐
│ Convolve image segment with Neural Net Model to determine │
│  probabilities that image regions that are inner or non-inner │
│           with respect to the tubular wall      │
└─────────────────────────────────────────────────┘
                        ↓
┌─────────────────────────────────────────────────┐
│ Identify boundary between inner and not-inner regions to │
│          define the tubular surface.            │
└─────────────────────────────────────────────────┘
                        ↓
┌─────────────────────────────────────────────────┐
│ Concatenate all identified surfaces and render model of │
│                   tubular.                      │
└─────────────────────────────────────────────────┘
```

MACHINE LEARNING MODEL FOR IDENTIFYING SURFACES IN A TUBULAR

RELATED APPLICATIONS

This application claims priority to United Kingdom Patent Application Number 2100058.3, filed Jan. 4, 2021, the disclosure of which is incorporated herein by reference in its entirety.

FIELD OF THE INVENTION

The invention relates generally to inspection of fluid-carrying tubulars, in particular acoustic sensors detecting internal and external regions in oil and gas wells and pipelines.

BACKGROUND OF THE INVENTION

Cylindrical conduits such as well casings, tubulars and pipes may be imaged using ultrasound sensors mounted to a tool propelled through the conduit. Existing ultrasound tools comprise an array of piezoelectric elements distributed radially around the tool housing. The top surface of each element faces radially away from the tool towards the wall of the conduit. The reflected waves are received by the same elements and the pulse-echo time of the waves are used to deduce the distances to the internal and external walls and voids therebetween. The elements may be angled slightly off radial, such that some of the energy reflects away from the transducer and some backscatters off features, per PCT Application WO 2016/201583 published Dec. 22, 2016, to Darkvision Technologies.

The reflections are image processed to generate a 2D or 3D geometric model of the conduit, then rendered for visualization at a monitor. However, there are numerous errors in the logging process that need to be corrected to represent the surface smoothly. The reflected signals often contain noises from particles in the fluid, secondary reflections, and ringing in the conduit material. Moreover, there can be dead sensor elements or the whole tool can be decentralized. This tends to lead to discontinuities and skewing in the visualization even through the conduit is generally cylindrical with a smooth surface.

SUMMARY OF THE INVENTION

In accordance with a first aspect of the invention there is provided a method of processing acoustic images of a tubular, the method comprising: receiving acoustic images of the tubular from an acoustic logging tool; convolving the acoustic images with a Machine Learning model to output probabilities that regions of the images are internal regions or non-internal regions; determining a boundary between internal and non-internal regions based on their probabilities; identifying surface pixels in the acoustic images corresponding to the boundary; and storing a result of the processing in a datastore.

In accordance with a first aspect of the invention there is provided an apparatus for processing acoustic images of a tubular comprising: a non-transitory computer readable medium having instructions executable by a processor to perform operations comprising: receiving acoustic images of the tubular; convolving the acoustic images with a Machine Learning model to output probabilities that regions of the images are internal regions or non-internal regions; determining a boundary between internal and non-internal regions based on their probabilities; identifying surface pixels in the acoustic images corresponding to the boundary; and storing a result of the processing in a datastore.

Further aspects of the invention are set out below and in the appended claims. Thus preferred embodiments of the invention enable the device to automatically identify surfaces of imaged tubulars, such as pipes and wells, and remove noise from rendering of it to a user.

BRIEF DESCRIPTION OF THE DRAWINGS

Various objects, features, and advantages of the invention will be apparent from the following description of embodiments of the invention and illustrated in the accompanying drawings. The drawings are not necessarily to scale, emphasis instead being placed upon illustrating the principles of various embodiments of the invention.

FIG. 7 is a workflow for building a using a neural net model.

DETAILED DESCRIPTION OF THE INVENTION

The present invention may be described by the following preferred embodiments with reference to the attached drawings. Disclosed are a method and system to automatedly identify image internal and external regions in a logged well from ultrasound images using a computer model. The model is a Machine Learning model. Advantageously, the present system may identify the tubular surface, i.e. the boundary between internal and external regions in the tubular, that are difficult for a human operator to trace. In difficult cases, the tubular surface might exhibit degrading features include glints, ringing, frequency changes, refraction, depth information, surfaces mating and materials affecting the speed of sound.

Radially Configured Sensors

The transducers are preferably a phased array operating in the ultrasound band. The present imaging tool is preferably that of the leading technology in this area, exemplified by: U.S. Pat. No. 10,781,690 filed 6 Oct. 2016 and entitled "Devices and methods for imaging wells using phased array ultrasound"; Patent Applications US20200055196A1, filed 13 Aug. 2019 entitled "Device and Method to Position an End Effector in a Well", both incorporated by reference.

In these disclosures, an array of ultrasound transducers uses beamforming to capture images of a downhole casing. Typically, images are captured as frames from the whole array, while the tool is conveyed through the casing to log a long section of the casing. The result is a 3D ultrasound image with millimeter resolution, which may be stored raw, demodulated, or data compressed into local storage and then transmitted to a remote workstation 19 for further image processing, as described herein below.

Figure 8A:
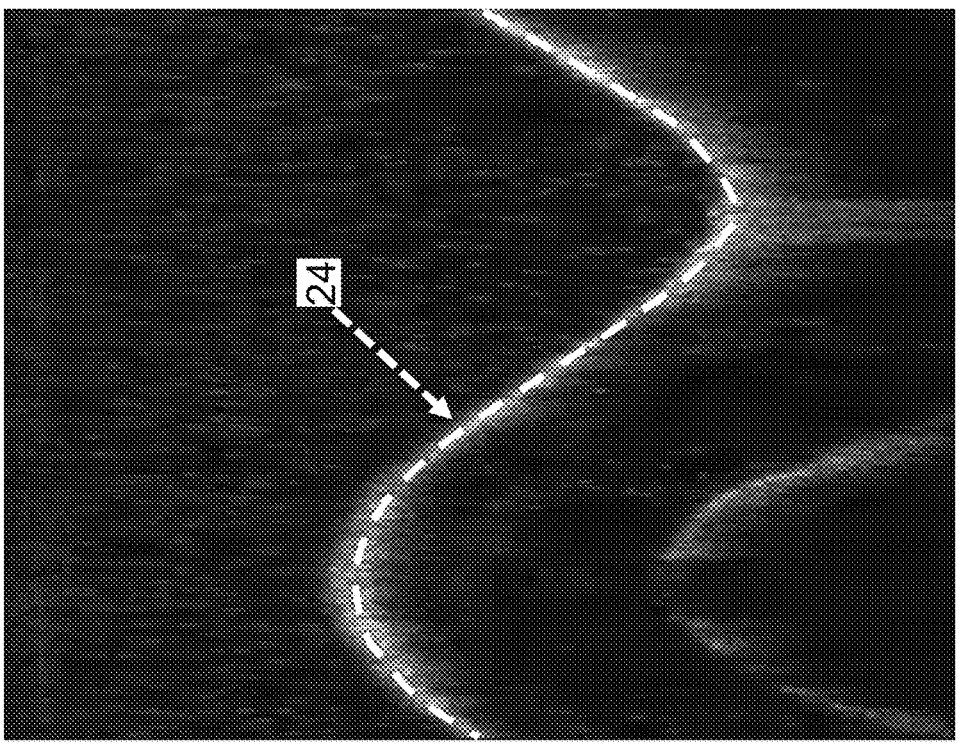
FIG. 8A is an unwrapped ultrasonic image.
Figure 8B:
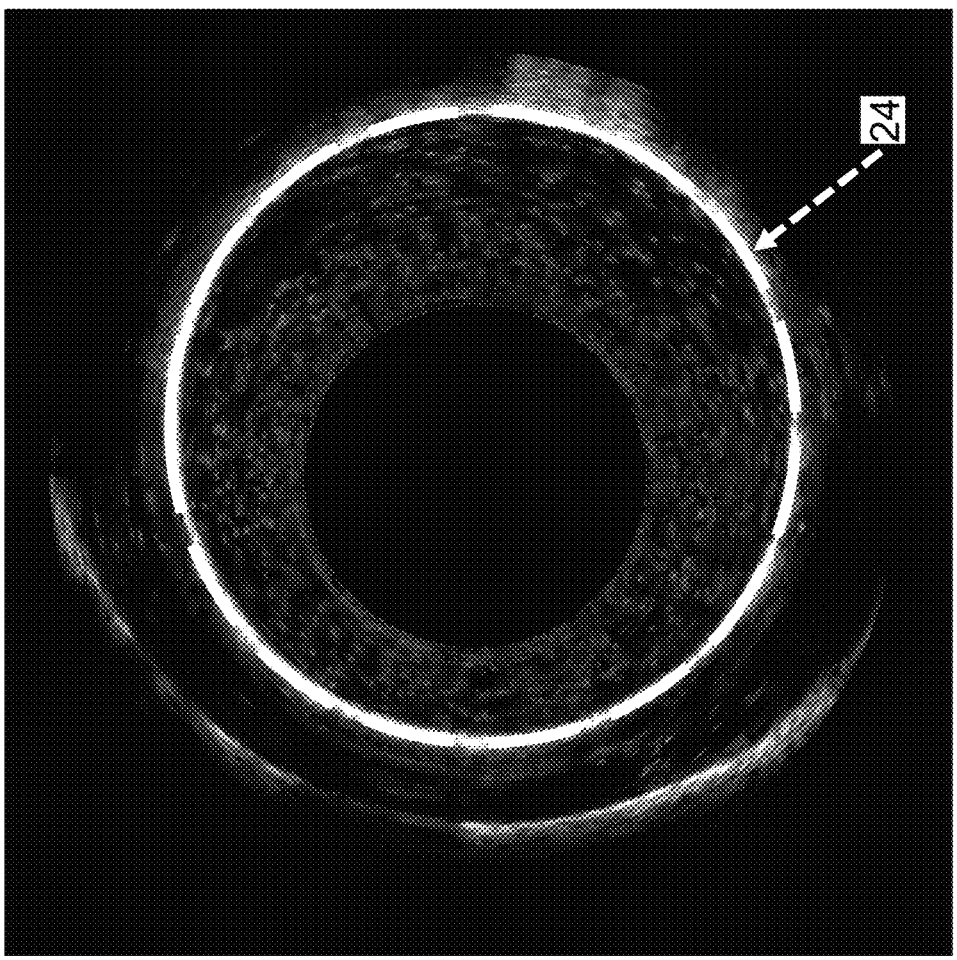
FIG. 8B is a wrapped ultrasonic image.

As an example, the imaging array 12 may be a radial array of 256 elements and captures cross sectional frames of the tubular at a given axial position z. An example image frame is shown in FIG. 8A, unwrapped, showing each scan line vs reflections in time. The sinusoidal nature of the surface is due to uncorrected eccentricity of the tool. This image may be shown wrapped, per FIG. 8B to show a more intuitive image in the transverse (X-Y) plane. Here a dashed line indicates the estimated location of the surface reflections. Other reflections come from particles or secondary reflections of the tubular.

The processor applies a Machine Learning (ML) model to the ultrasound image. Because pipes and wells are typically several thousand meters long, the ML model is applied to smaller image segments and later recompiled into a rendering 27 of the longer pipe or well. For selected image segment, the ML model returns a probabilities $P_{internal}$ that each image region is internal or external to the tubular.

As used herein, 'regions' may be a single pixel or contiguous areas/volumes of pixels sharing a common probability of being internal. The region does not necessarily correspond to pixels in the image space, but that is a convenient correspondence for computation. For example, the outcome may be that the physical region beyond 10 cm is 'external', which actually corresponds to thousands of pixels in image space.

Without loss of generality the ultrasound image may be 3-dimensional, in which case the exemplary neural nets provided herein below have an extra dimension to convolve. However, to reduce processing time, the ultrasound image may be a 2D image with depth (z) and azimuthal ($\Theta$) coordinates, as discussed above.

Figure 1:
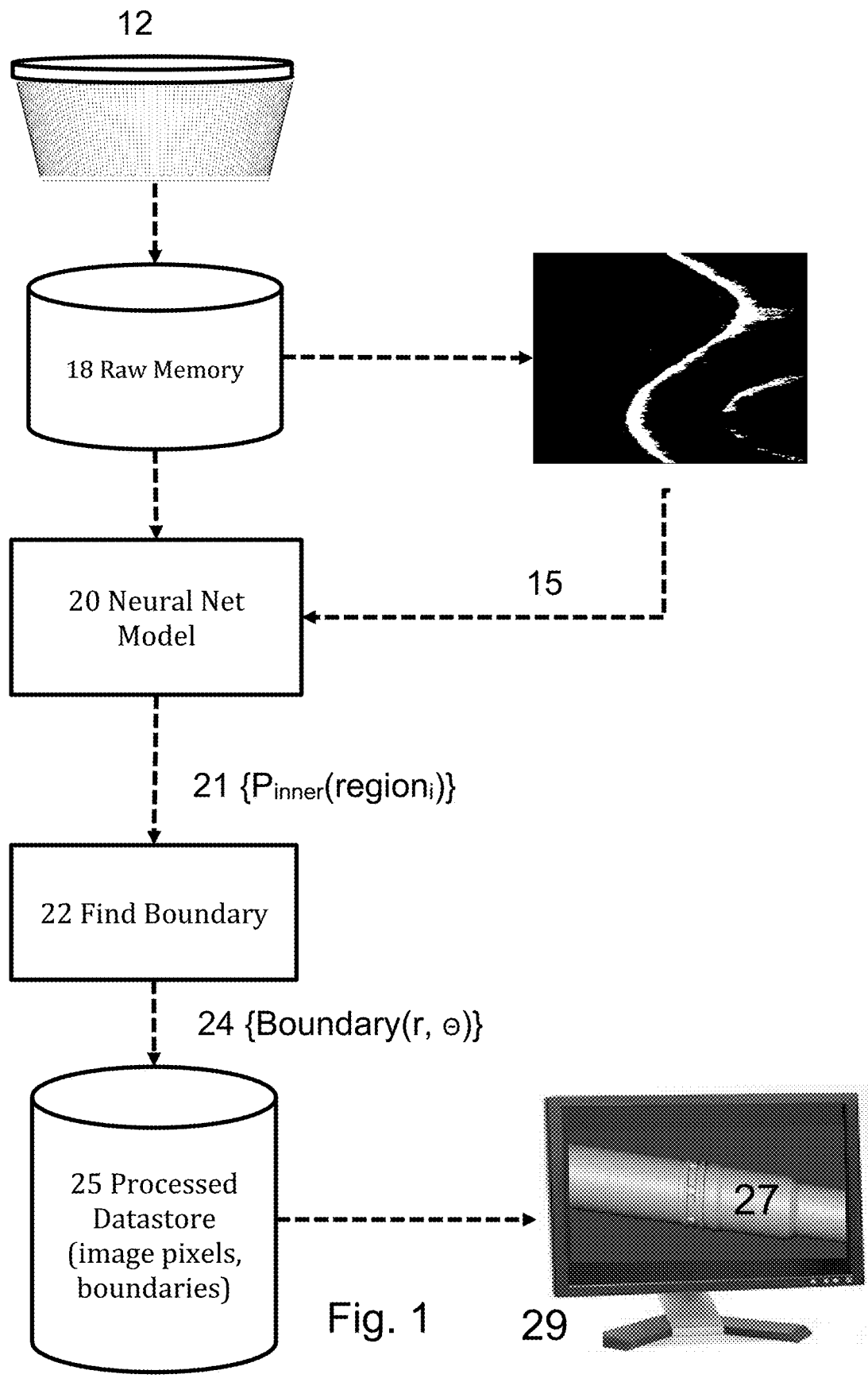
FIG. 1 is a block diagram of a computing modules in accordance with one embodiment.
Figure 2:
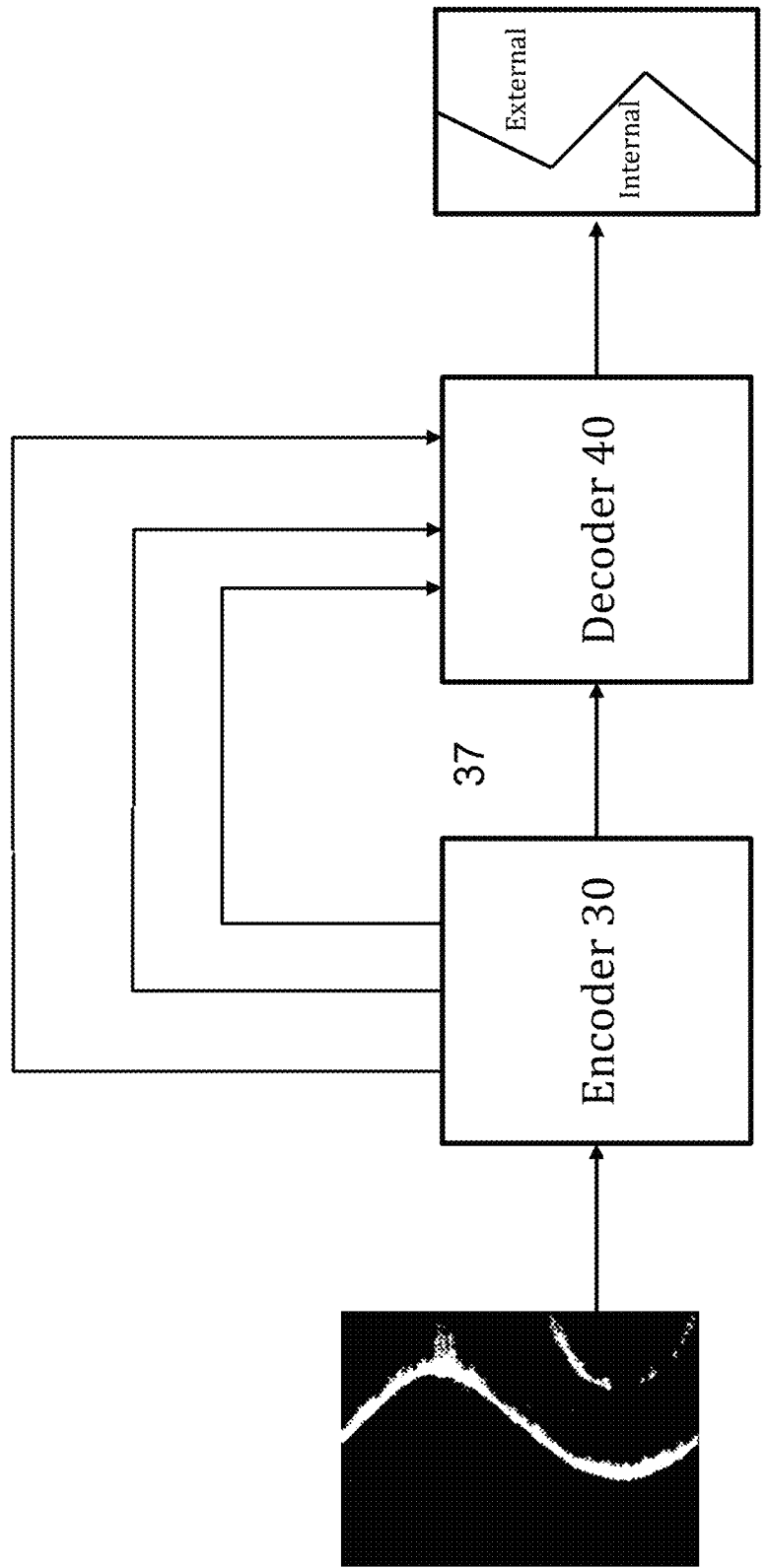
FIG. 2 is a block diagram of an encoder-decoder model's architecture.
Figure 3:
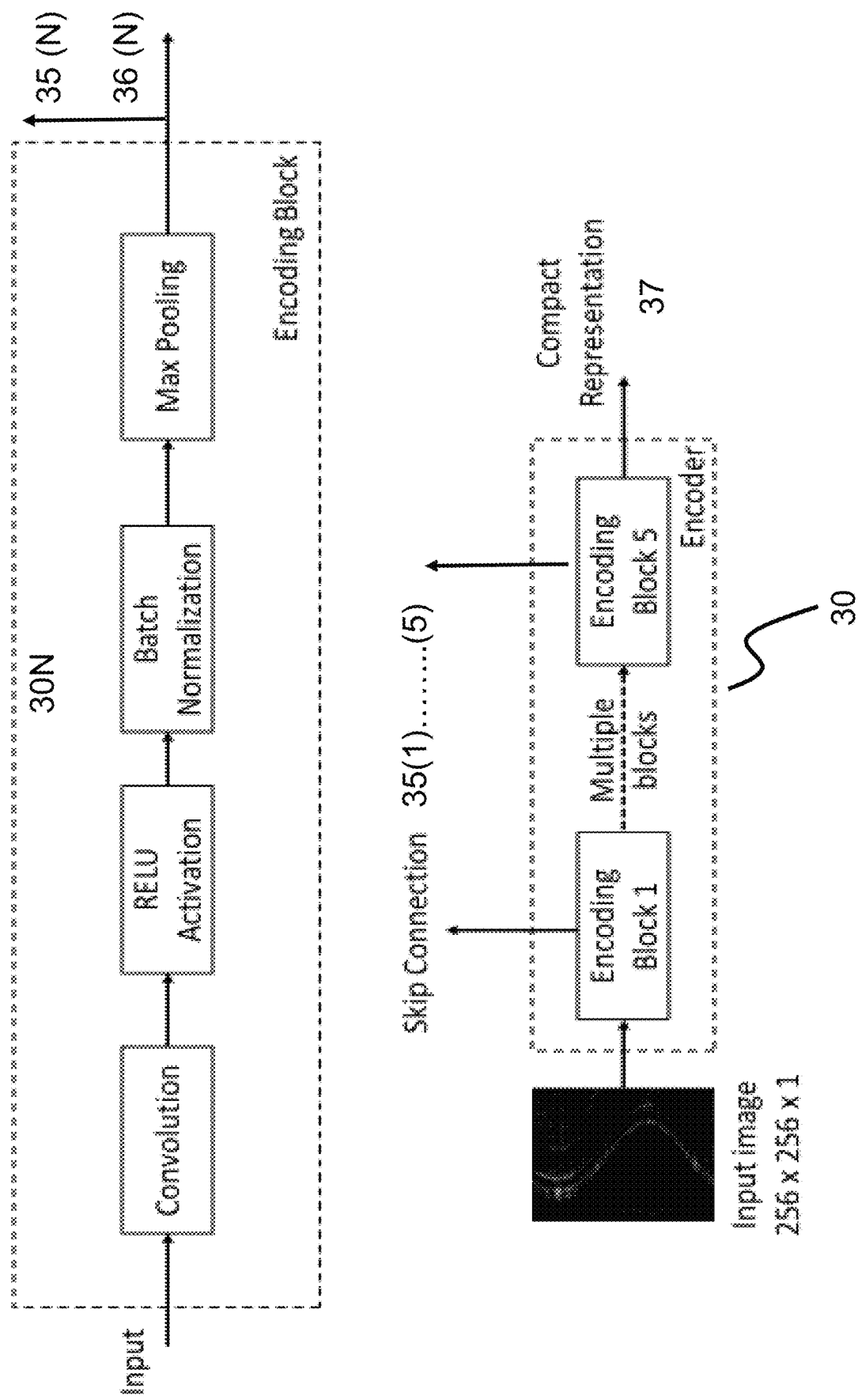
FIG. 3 is a block diagram of the encoder in FIG. 2.
Figure 4:
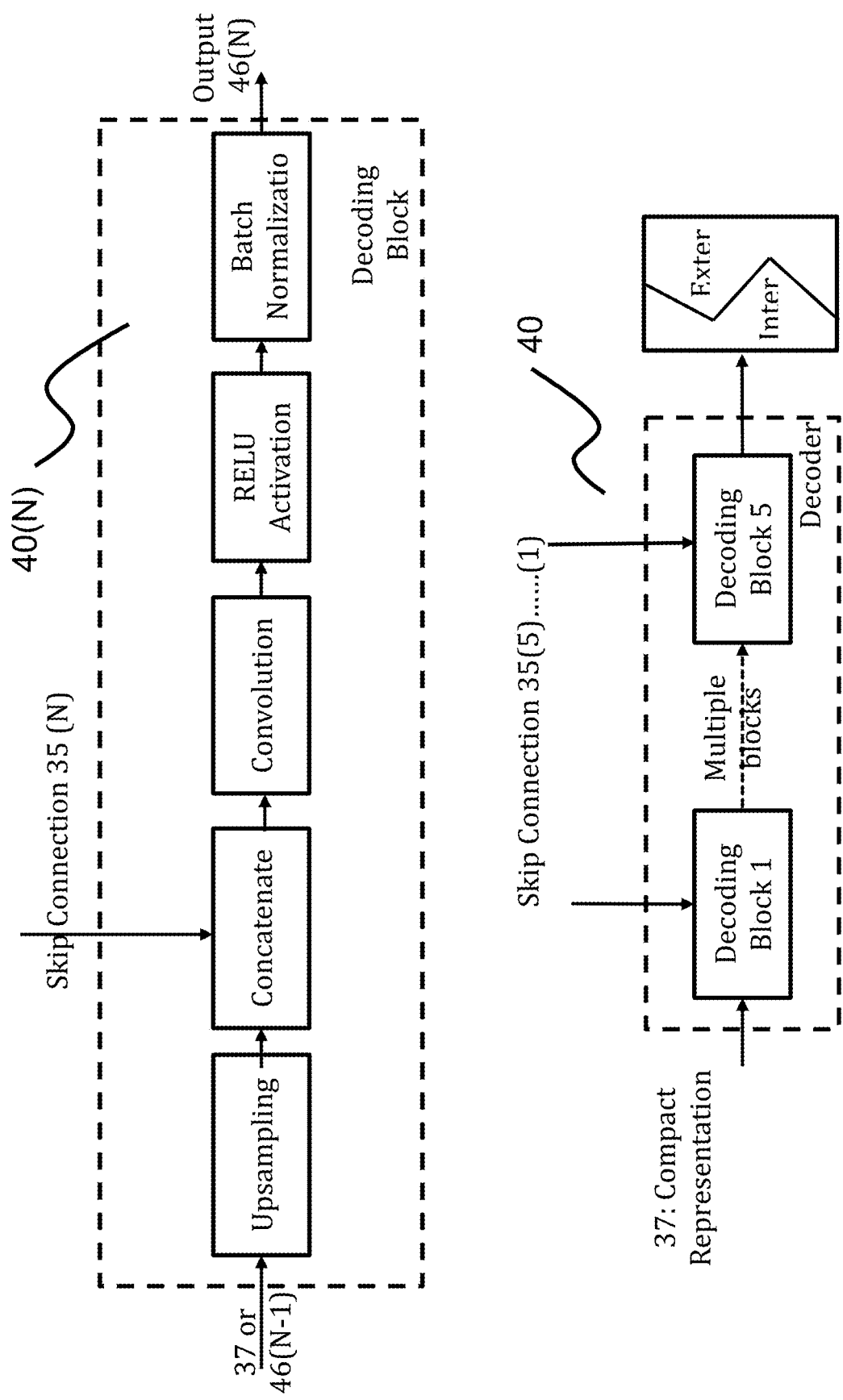
FIG. 4 is a block diagram of the decoder in FIG. 2.
Figure 5:
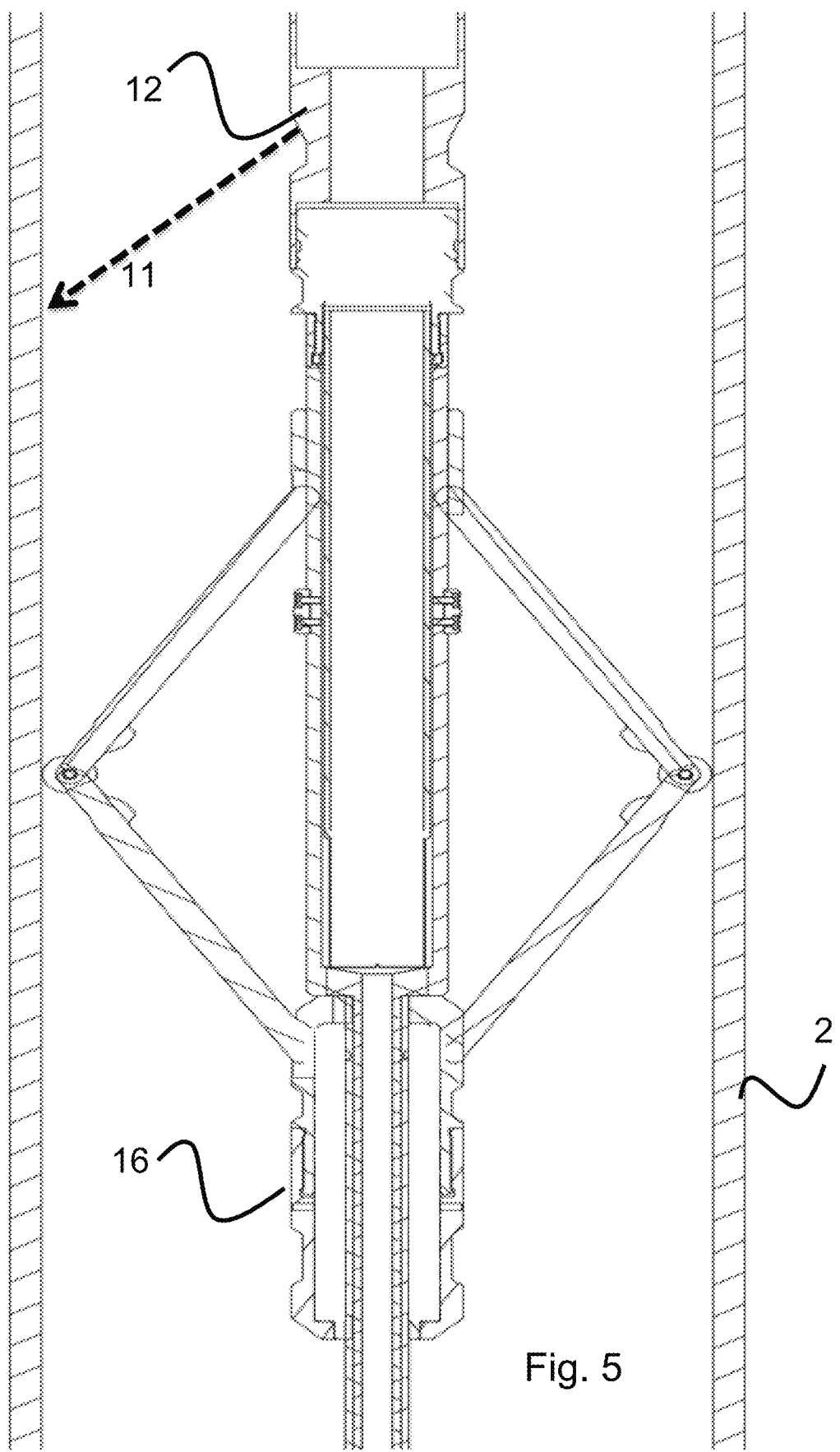
FIG. 5 is a cross-section of an imaging tool capturing acoustic images in a tubular.
Figure 6A:
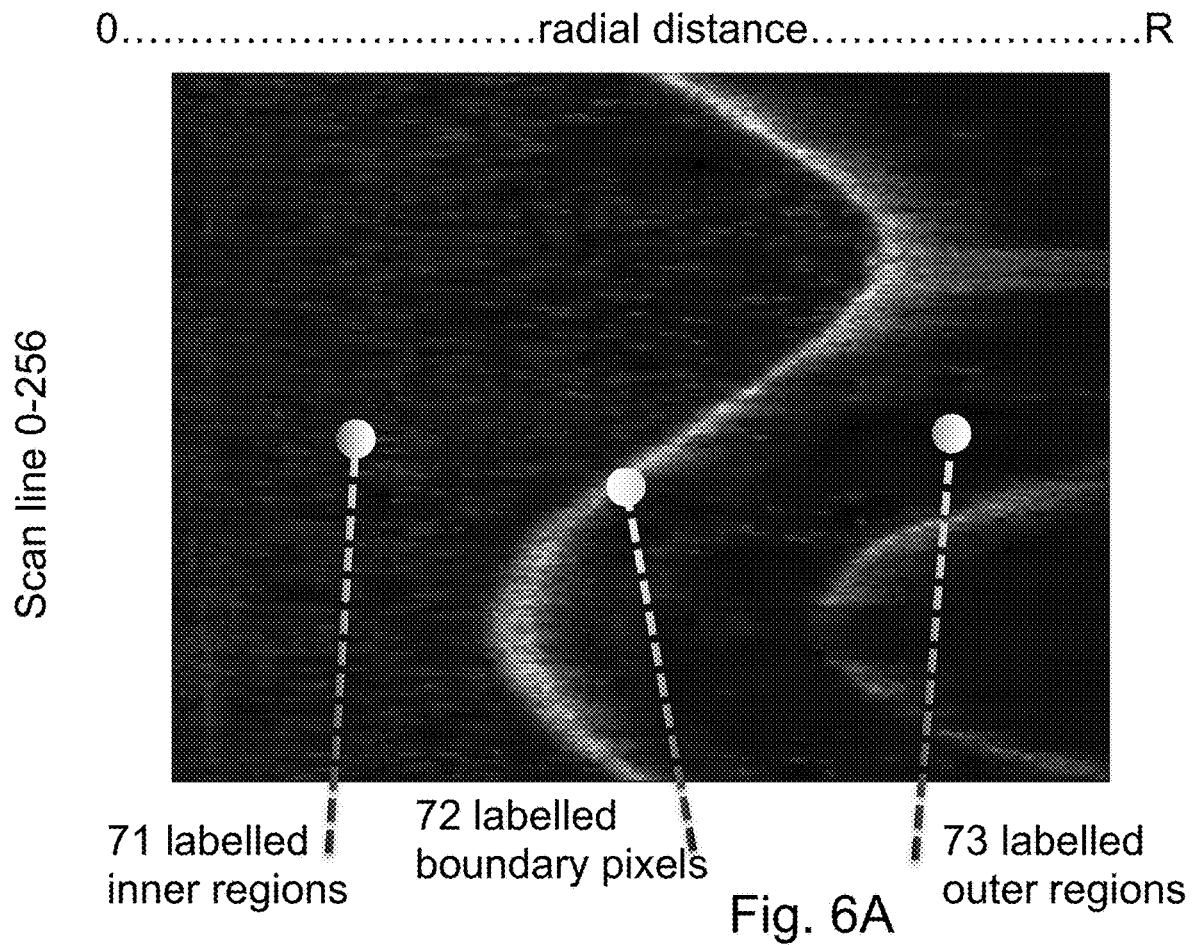
FIG. 6A is an unwrapped acoustic image of a single transverse frame for training.
Figure 6B:
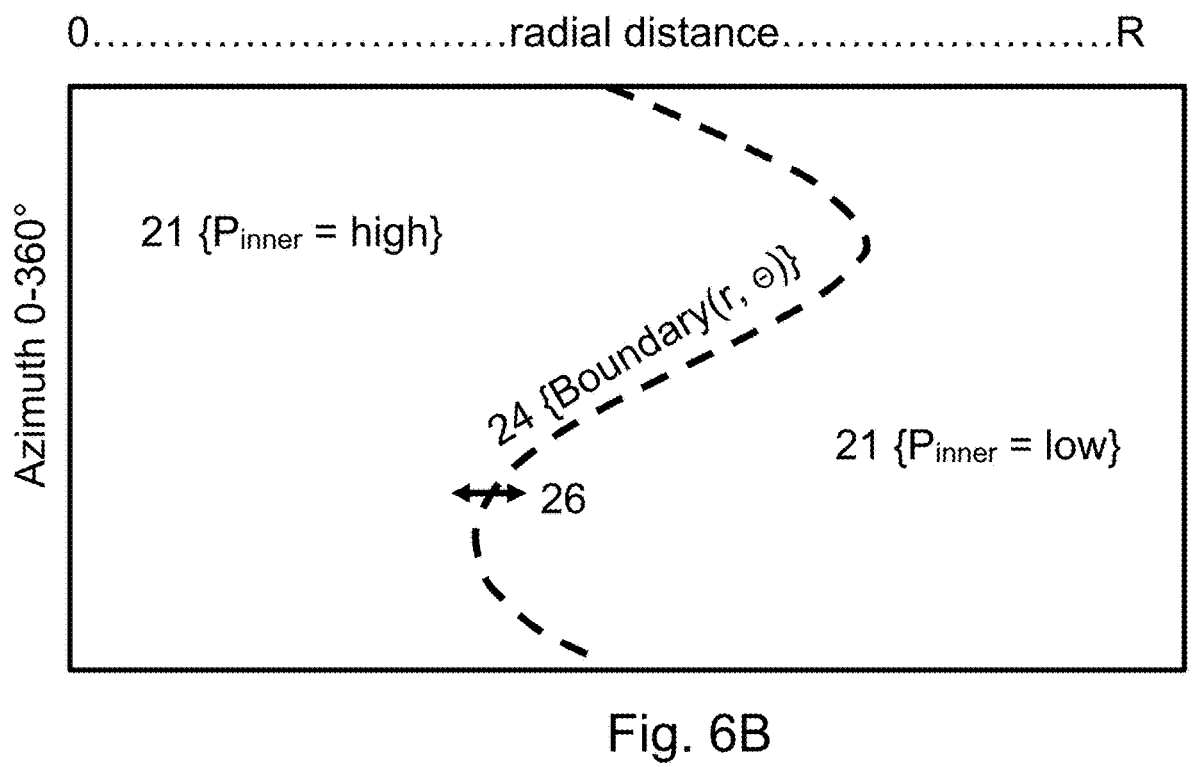
FIG. 6B is an unwrapped acoustic image of a single transverse frame after processing.

As shown in FIG. 1, a raw ultrasound image 15 from transducer array 12 may be convolved with a Neural Net 20 to output a probability map 21 that regions within the ultrasound image correspond to internal regions in the tubular. The probability that a region is 'external' is simply the complement of it being 'internal'. Further processing may involve finding the tubular surface by locating the transition between internal and external regions, (i.e. boundary 22), which identifies the surface of the tubular. This further output may be stored as pixel locations (z, r and $\Theta$), where the determined surface is.

The system maintains a database 25 to store image and surface metadata. For each log, the system may store raw images, modified images, surface image pixels, internal probabilities, and boundary locations (z and $\Theta$).

The inventors have found that a Convolutional Neural Net (CNN) is desirable because they are largely spatially invariant and computationally efficient, especially when run on a GPU or TPU (tensor processing unit). CNN architectures of the types used in RGB image processing to identify common objects may be used with some modifications to work on ultrasound "pixels" in circular images to identify apparatus. Modifications to their training are also provided below.

Image segment selection preferably involves only images that have been collected from a tubular. Invalid regions, including faulty hardware or images for which the acoustic sensor has not yet been inserted, need not be processed. This a priori knowledge may be provided from a human operator, as entries in a database, or as the result of a different ML model.

Even for valid segments, it might not be desirable to process all images uniformly along the tubular due to the sheer number of images. Given that the tubular boundary is smooth and changes slowly as the acoustic sensors move through it, in some embodiments the method only operates on a subset of these image segments. The choice of which image segment to process might simply involve skipping regular intervals, or it could be the output of a different ML model.

The image size of the segment selected for processing preferably relates (in terms of pixels) to the size of the GPU that can be stored for efficient matrix operations and relates (in terms of physical units) to the size of the apparatus. These are both related by the ultrasound scan resolution (pixels/mm or pixels/radian). In preferred embodiments, a region may be from 50 cm to 2 m axially, or may be 200-1000 pixels in either azimuthal or axial dimensions (not necessarily a square).

Input Representation

In the preferred system, the input data is represented in three main axes: $\Theta$, R and Z (the Z axis is also the logging axis separated in time by frames; R is the radial distance from the transducer array (or major axis of the tool), in directions transverse to the logging axis, measurable in time-sampled pixels or physical distance; and $\Theta$ corresponds to the azimuthal angle of a scan line in the transverse plane. Here, the $\Theta$-R plane represents data collected from a cross-sectional slice of the tubular at a specific axial position (z) or logging time instant (t). One efficient representation is averaging the intensities over R for each scan line. Hence, the entire well or pipe can be represented by a 2-dimensional stream of 2D segments in the $\Theta$-z plane, where every pixel along the $\Theta$-axis at a given z, represents averaged line intensities. The size of the image to process may be based on the estimated apparatus size.

Machine Learning Model

The ML model presented in this embodiment may use a U-Net architecture. The output of this model partitions the image into internal and external regions. While the input to this model is a gray-scale image (e.g. 256z×256$\Theta$×1), without loss of generality a sequence of images could be fed to similar architectures. The network uses an encoder and decoder modules for assigning pixels to internal and external regions.

The purpose of the encoder module is to provide a compact representation of its input. This module may comprise five convolution layers, but fewer or more layers could be used, trading off accuracy and processing time. Alternatively, spatial attention layers could be used instead of convolution layers. For a sequence of images, Recurrent Neural Networks (RNN), Long Short-Term Memory (LSTM) or spatio-temporal attention models could be used.

For activation functions, the encoder architecture uses Rectified Linear Units (ReLU), but other activation function such as Leaky or Randomized ReLUs could also be used to improve the accuracy of the model. The architecture further employs a Batch Normalization layer, which normalizes and scales the input feature maps to each convolutional layer. Batch Normalization layers help in speeding up the training process and reduce the possibility of the model overfitting the training data. Because Batch Normalization helps reduce overfitting, the model does not need Dropout layers.

The decoder module creates the probability map of a pixel belonging to external or an internal region. The input of the decoder module is the compact representation given by the encoder. This module comprises of five convolution layers with RELU activations, but fewer or more layers could be used as well. Similar to the encoder module, RNNs, LSTMs or spatio-temporal attention layers could be used for sequential input. In order to expand the compact representation, up-sampling functions are used in-between convolution layers.

The architecture may employ an Adam optimizer for training the ML model, as it is easier to tune than a stochastic gradient descent optimizer. A stochastic gradient descent with momentum is also an alternative. A learning rate scheduler may be used to reduce the learning as a function of the current training epoch. The loss function for the optimizer is the binary cross entropy function.

The system initially builds a training dataset of apparatuses with different orientation angles, intensities, geometry and sizes. The training set may be generated by data-augmentation of collected, ultrasound images with labelled regions or pixels ('INTERNAL', 'NON-INTERNAL). The training set may also comprise augmented images flipped around an axis, changing the brightness and the contrast of the image, without affecting the estimated label.

The boundary 22 between these internal and external regions is determined by the process to be the tubular surface. Thus, the system may automatically identify the tubular surface as this boundary, by looking for a threshold change in probability of being 'internal' along a scan line. That is, for a given scan line some contiguous internal radius will be above the probability threshold of being internal, followed by a contiguous external radius below that threshold.

This threshold can be a fixed probability or computed dynamically to find an optimal threshold that is able to differentiate internal and external regions. For example, there may be cases where most regions are computed to have very high probability of being internal, so the dynamic threshold is set higher to return boundaries, preferably close to the known radius of the tubular. After thresholding, the processor may then classify regions as 'internal', 'tubular' or 'external', rather than a probability of such.

In one embodiment, the processor calculates the gradient of the probability map and scans it row by row. The first peak along the gradient image may be declared the boundary. This tends to be fast but less accurate.

Alternatively, the process may use seam carving, as disclosed in GB2019014401 filed 4 Oct. 2019 entitled "Surface extraction for ultrasonic images using path energy." This technique generally finds the brightest "column". This tends to be more accurate but slower.

Figure 9:
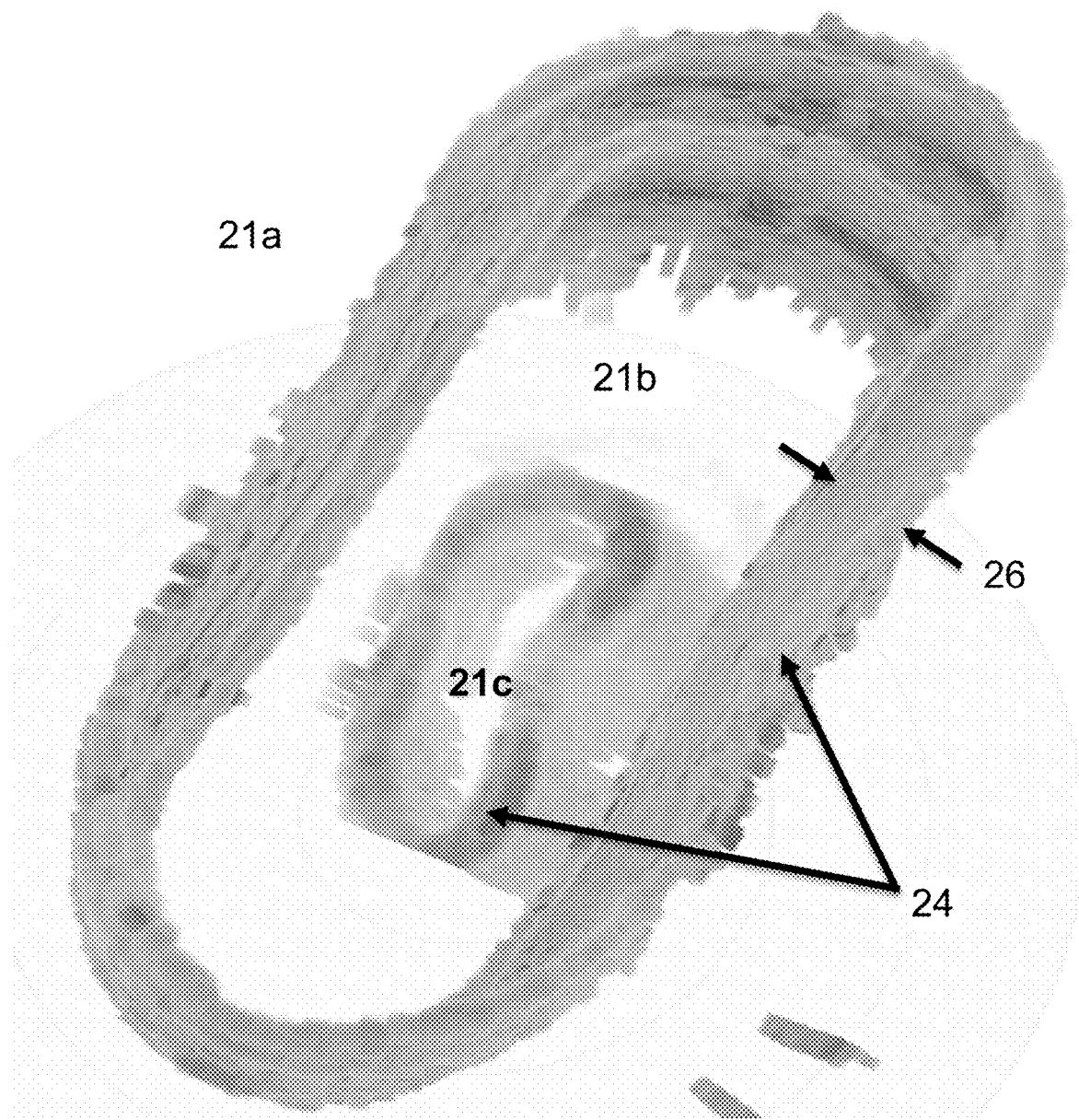
FIG. 9 is an illustration of surface finding in a multi-region situation.

Although the simpler case is finding a circular one-dimensional boundary in a frame between regions of probability, the architecture may be structured and trained to find two-dimensional surfaces of other shapes. This is relevant in downhole and pipeline applications, where objects become stuck (aka FISH) or the structure becomes deformed. FIG. 9 shows a perspective view thru a cross-section of a crushed pipe located within another crushed pipe. This may be seen as four surfaces, two boundaries 24, and three regions 21a,b,c. In this example, the pipes were imaged using an axial-facing ultrasound array, such as that disclosed in Patent Application 1 GB1813356.1, filed Aug. 8, 2018 entitled "Device and method to position an end effector in a well." Such a device is movable around in the pipe to capture reflections from different angles.

In one preferred embodiment, the U-Net model receives ultrasound intensity images in polar coordinates. To improve training time and accuracy, these images are first normalized per scanline. The U-Net model compromises multiple layers of "standard-units". These standard-units are the atomic building parts of the model and comprise batch normalization, convolution and activation units.

In the U-Net model, these standard-units are followed by pooling layers to decrease the dimensionality of their outputs in a downward path. The successive operation of standard-units and pooling layers gradually decreases the dimensionality of features into a bottleneck, which is a compact representation of the entire image. After the bottleneck, the standard-units are followed by unpooling layers to increase the dimensionality of feature maps to the original image size in an upward path.

Skip connections between downward and upward paths are used to concatenate feature maps. These skip connections create a gradient highway, which decreases training time and improves accuracy.

The output of the U-Net may be probabilities for regions of being inner (i.e. 21b) or not (i.e. 21c and 21 a). Alternatively, the output may be multiple classes 21a, 21b, 21c (most outer, inner, most inner). As above, the boundaries 24 are determined as the locations of gradient changes in these regions' class or probability. In this application, it may be optimal to consider gradients in three dimensions.

In certain embodiments the output may be the probabilities of being one of three regions (internal, external, void). Here a void may be a rupture or perforation of the tubular, i.e. there is no metal at a location but there should be by inference to the surrounding metal regions. There will be an internal region, then a void region and then an external region, even though there are no direct surface reflections to find these boundaries. In such situations, the image of the tubular near a void tend to return abnormal and characteristic reflections from edges of the void. The model is trained on images containing such voids with pixels/voxels labelled as 'void.'

Image Processing and Rendering

The system may then selectively operate on image data for the determined internal/external/surface regions. These operations may include filtering, contrasting, smoothing, or hole-finding of the image data. The system may visualize and render the tubular to a user on a display 29 using the modified internal/external/surface pixels.

For example, the system may remove all image data (i.e. set pixels to clear) for internal and external pixels and display only pixels from within some width of the identified boundary pixels. This is useful in visualizing the tubular itself with its surface features, such as cracks and perforations.

Alternatively, the system could remove external image data to render just acoustic reflections from particles in the fluid. Alternatively, the system could remove internal image data to render just acoustic reflections from the external cement bond, rock formation or apparatus attached to the tubular.

Geometric Analysis.

Figure 10:
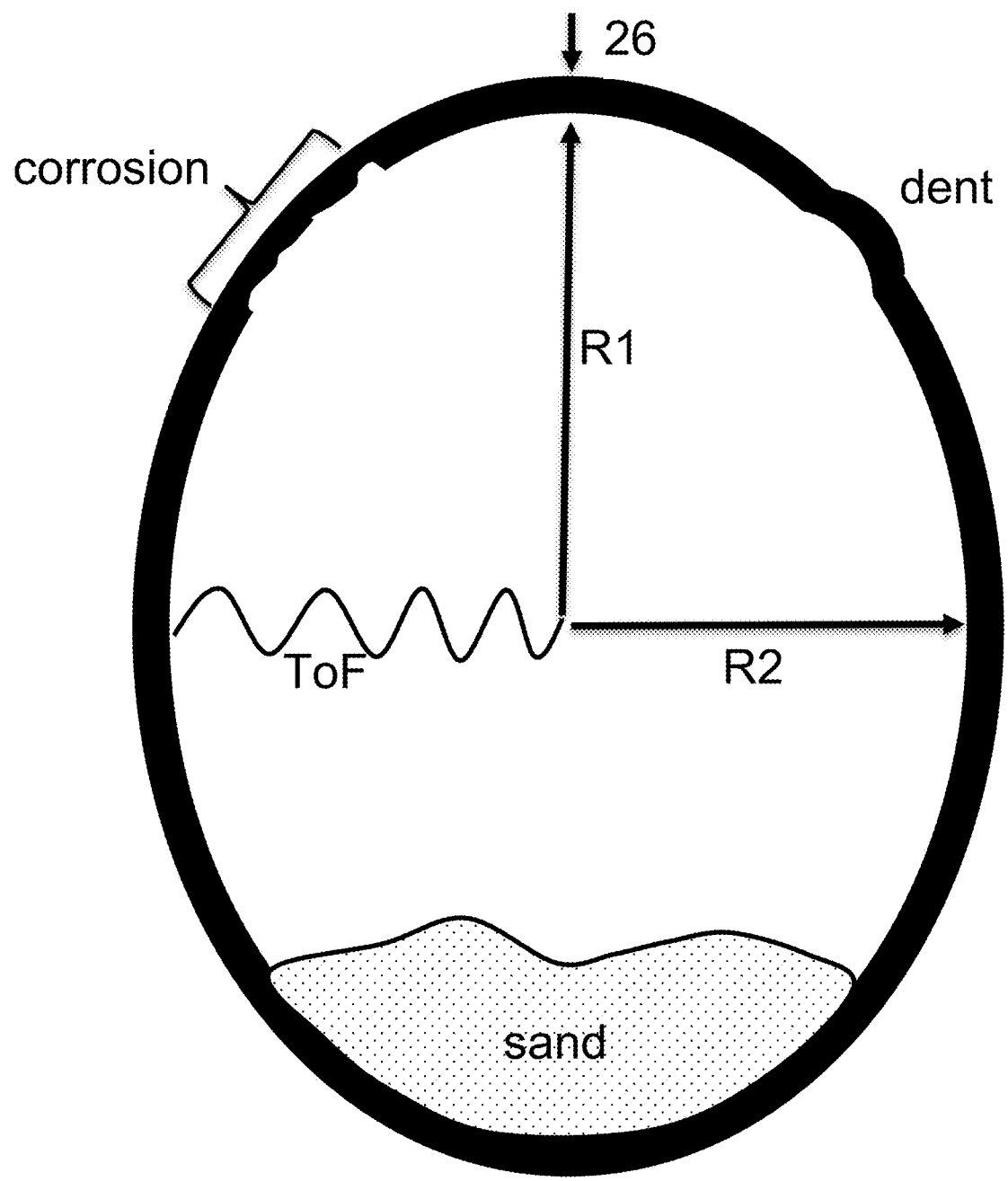
FIG. 10 is an illustration of geometric features in an imaged tubular.
Figure 11:
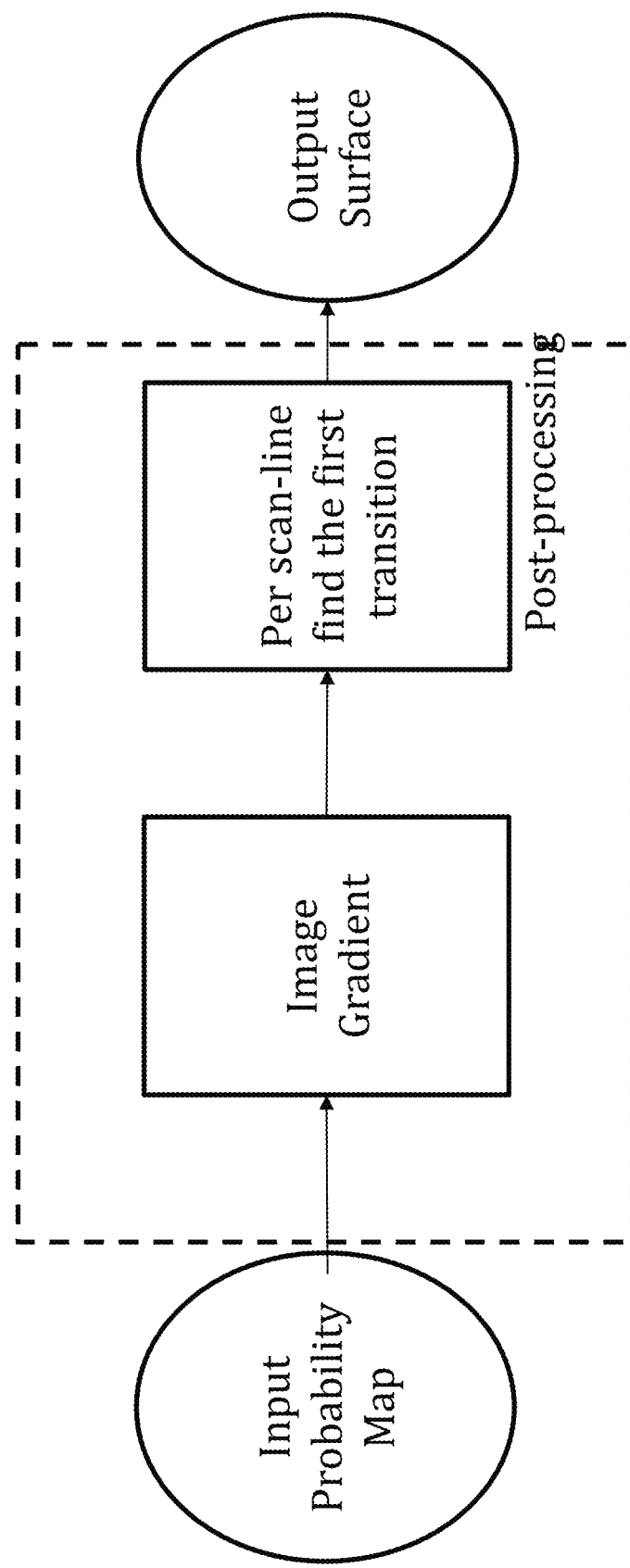
FIG. 11 is a filter for mapping pixel probabilities to surface pixels.
Figure 12:
FIG. 12 is a rendered image of a tubular after processing.

The results of the surface detection and image processing may also be used to compute features of the tubular, without need to visualize it for a user. FIG. 10 illustrates geometric features that may be identified from the determined surface. For example, the processor may compute properties of: ovality of the tubular using an ellipse fit to the boundary 24; wall thickness of the tubular over region 26; Speed of Sound correction for the fluid from knowledge of the tubular diameter vs time-of-flight (ToF) of the ultrasound to the determined surface.

Qualifiable features such as dents (low frequency variation in radius), surface corrosion (high frequency variation in radius), sand build up may also be computed and reported with the relevant location.

Terms such as "top", "bottom", "distal", "proximate" "downhole", "uphole", "below," "above," "upper", "downstream," "axial, lateral" are used herein for simplicity in describing relative positioning of elements of the conduit or device, as depicted in the drawings or with reference to the surface datum. Although the present invention has been described and illustrated with respect to preferred embodiments and preferred uses thereof, it is not to be so limited since modifications and changes can be made therein which are within the scope of the appended claims as understood by those skilled in the art.

The invention claimed is:

1. A method of processing acoustic images of a tubular, the method comprising:
   receiving acoustic images of the tubular from an acoustic logging tool;
   convolving the acoustic images with a Machine Learning model to output probabilities that regions of the images are internal regions or non-internal regions;
   determining a boundary between internal and non-internal regions based on their probabilities;
   identifying surface pixels in the acoustic images corresponding to the boundary; and
   storing a result of the processing in a datastore.

2. The method of claim 1, further comprising filtering the acoustic images based on whether pixels in the acoustic images correspond to internal or non-internal regions and displaying the filtered acoustic images to a user.

3. The method of claim 1, further comprising rendering a visualization of the tubular to a user from the identified surface pixels in the acoustic images.

4. The method of claim 1, further comprising selecting acoustic images from a contiguous length of the tubular.

5. The method of claim 1, wherein the boundary is determined by a threshold function of probability.

6. The method of claim 1, wherein the processing steps are performed for each frame of the acoustic images, whereby each frame corresponds to a cross-section of the tubular.

7. The method of claim 1, wherein the result to store is one of: the probabilities that regions of the images are internal regions or non-internal regions; a definition of the boundary; and the identified surface pixels.

8. The method of claim 1, further comprising deploying the acoustic logging tool having an acoustic sensor into the tubular, imaging the tubular with the acoustic sensor to provide the acoustic images, and transmitting the acoustic images to a remote computer for the processing steps.

9. The method of claim 1, wherein the Machine Learning model comprises a machine learning classifier, preferably a Convolutional Neural Net.

10. The method of claim 1, further comprising training a classifier of the computer model with a set of training images of tubulars with labelled regions.

11. The method of claim 1, further comprising image processing the identified surface pixels to detect features selected from one or more of: tubular thickness, dents, pitting, corrosion, deposit build-up, and voids in the tubular.

12. An apparatus for processing acoustic images of a tubular comprising:
a computer processor, a datastore for storing the acoustic images, and a non-transitory computer readable medium having instructions executable by the processor to perform operations comprising:
   receiving the acoustic images of the tubular;
   convolving the acoustic images with a Machine Learning model to output probabilities that regions of the images are internal regions or non-internal regions;
   determining a boundary between internal and non-internal regions based on their probabilities;
   identifying surface pixels in the acoustic images corresponding to the boundary; and
   storing a result of the processing in the datastore.

13. The apparatus of claim 12, the processor further performing filtering the acoustic images based on whether pixels in the acoustic images correspond to internal or non-internal regions and displaying the filtered acoustic images to a user.

14. The apparatus of claim 12, the processor further performing rendering a visualization of the tubular to a user from the identified surface pixels in the acoustic images.

15. The apparatus of claim 12, the processor further performing selecting acoustic images from a contiguous length of the tubular for processing.

16. The apparatus of claim 12, wherein the boundary is determined by a threshold function of probability.

17. The apparatus of claim 12, wherein the result to store is one of: the probabilities that regions of the images are internal regions or non-internal regions; a definition of the boundary; and the identified surface pixels.

18. The apparatus of claim 12, wherein the datastore or another datastore stores the Machine Learning model comprising a machine learning classifier.

19. The apparatus of claim 12, wherein the datastore or another datastore stores the Machine Learning model comprising a Convolutional Neural Net.

20. The apparatus of claim 12, the processor further performing image processing the identified surface pixels to detect features selected from one or more of: tubular thickness, dents, pitting, corrosion, sand build-up, and voids in the tubular.

* * * * *